United States Patent Office 3,743,733
Patented July 3, 1973

3,743,733
METHOD OF TREATING BRONCHIAL ASTHMA
William J. Houlihan, Mountain Lakes, N.J., assignor to Sandoz-Wander, Inc., Hanover, N.J.
No Drawing. Continuation-in-part of abandoned application Ser. No. 100,534, Dec. 21, 1970. This application July 26, 1971, Ser. No. 166,282
Int. Cl. A61k 27/00
U.S. Cl. 424—251  3 Claims

ABSTRACT OF THE DISCLOSURE

Substituted quinazolins, e.g. 3a-p-anisyl-1,2,3,3a,4,5-hexahydro-pyrrolo[1,2-a]quinazolin-5-one, useful in the treatment of bronchial asthma.

---

This application is a continuation-in-part of Ser. No. 100,534 filed Dec. 21, 1970, now abandoned.

This invention relates to substituted quinazolines and to their use as bronchodilators. This invention also relates to pharmaceutical compositions containing the above as an active ingredient thereof and the method of using such compositions for the treatment of bronchial asthma. The compounds of this invention may be represented by the following structural formula:

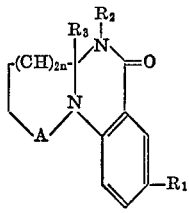

wherein
$n$ is 0 or 1,
A is carbonyl or methylene,
$R_1$ is hydrogen or chloro,
$R_2$ is hydrogen or phenyl,
$R_3$ is lower alkyl having 1 to 6 carbon atoms, e.g., methyl, ethyl, propyl, isopropyl, amyl or hexyl, or

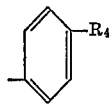

where
$R_4$ is hydrogen, halo having an atomic weight of 19 to 36 straight chain lower alkyl having 1 to 5 carbon atoms, e.g., methyl, ethyl, propyl, butyl or amyl, or straight chain lower alkoxy having 1 to 4 carbon atoms, e.g., methoxy, ethoxy, propoxy or butoxy, or

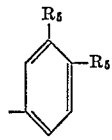

and where
$R_5$ is straight chain lower alkyl having 1 to 5 carbon atoms, e.g., methyl, ethyl, propyl, butyl or amyl.

The compounds of Formula I are known and are disclosed in U.S. Pat. 3,441,566, and the present invention only contemplates the novel use of such compounds, particularly as bronchodilators. This use is indicated by observing the respiratory status on intraperitoneal administration of the unanesthetized guinea pig exposed to aerosolized histamine dihydrochloride according to a modification of the method of Van Arman, Miller and O'Malley (J. Pharmacol. Exptl. Therap. 133:90–97, 1961); and in vitro by observing the effect on spirally cut strips of guinea pig trachea prepared as described by Ronstantine (J. Pharm. Pharmacol. 17:384–385, 1965) and tracheal chains prepared according to Foster (J. Pharm. Pharmacol. 12:189–191, 1960).

As indicated, the compounds of Formula I are useful as bronchodilators. For such usage, the compounds may be administered orally or parenterally or in inhalation therapy, e.g., nebulizers, vaporizers, aerosols and the like, as such or admixed with conventional pharmaceutical carriers. The preferred mode of administration is orally. They may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, oral liquids, e.g., suspensions may contain the active ingredient in admixture with any of the conventional excipients utilized for the preparation of such compositions, e.g., suspending agents (methyl-cellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calicum phosphate and kaolin. The injectable compositions are formulated as known in the art and may contain appropriate dispersing or wetting agents and suspending agents identical or similar to those mentioned above. These pharmaceutical preparations may contain about 10–90% of the active ingredient in combination with the carrier or adjuvant.

The dosage of active ingredient employed for the alleviation of bronchial asthma may vary depending on the severity of the condition being treated. However, in general, satisfactory results are obtained when the compounds of Formula I are administered at a daily dosage of from about 0.002 milligram to about 60 milligram-per kilogram of animal body weight, preferably given in divided doses 2 to 4 times a day, or in sustained release form. For most large mammals, the total daily dosage is from about 0.1 to about 100 milligrams. Dosage forms suitable for internal use comprise from about 0.025 to about 50 milligrams of the active compound.

The dosage of active ingredient employed for oral administration in inhalation therapy may vary depending upon the severity of the condition being treated. However, in general, satisfactory results are obtained when the compounds of Formula I are administered at a daily dosage of from about 0.5 to 2 milliliters of a 0.5–10% solution nebulized for oral inhalation 2 to 4 times per day. For most large mammals, the total daily dosage is from about 0.5 to 2 milliliters of a 0.1–5% solution nebulized for oral inhalation.

The preferred pharmaceutical compositions from the standpoint of preparation and ease of administration are solid compositions, particularly hard-filled capsules and tablets.

The following examples are provided for the purpose of illustration and not by way of limitation. They are not intended so as to limit the scope of the invention as defined in the appended claims.

EXAMPLES 1 AND 2

Tablets and capsules suitable for oral administration

Tablets and capsules containing the ingredients indicated below may be prepared by conventional techniques and are useful in treating bronchial asthma at a dose of one tablet or capsule 2 to 4 times a day.

| Ingredients | Weight (mg.) | |
|---|---|---|
| | Tablet | Capsule |
| 3a-p-anisyl-1,2,3,3a,4,5-hexahydropyrrolo [1,2-a]quinazolin-5-one | 25 | 25 |
| Tragacanth | 10 | |
| Lactose | 222.5 | 275 |
| Corn starch | 25 | |
| Talcum | 15 | |
| Magnesium stearate | 2.5 | |

EXAMPLES 3 AND 4

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of bronchial asthma. The injectable suspension is suitable for administration once a day whereas the oral liquid suspension is suitably administered 2 to 4 times per day for this purpose.

| Ingredients | Weight (mg.) | |
|---|---|---|
| | Sterile injectable suspension | Oral liquid suspension |
| 3a-p-anisyl-1,2,3,3a,4,5-hexahydro-pyrrolo [1,2-a]quinazolin-5-one | 25 | 25 |
| Sodium carboxy methyl cellulose U.S.P. | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | q.s. |
| Color | | q.s. |
| Methyl paraben, U.S.P. | | 4.5 |
| Propyl paraben, U.S.P. | | 1.0 |
| Polysorbate 80 (e.g. Tween 80), U.S.P. | | 5 |
| Sorbitol solution, 70%, U.S.P. | | 2,500 |
| Buffer agent to adjust pH for desired stability | q.s. | q.s. |
| Water | (1) | (2) |

¹ For injection, q.s. to 1 ml. ² q.s. to 5 ml.

EXAMPLE 5

Aerosol formulation-metered valve system (0.5 milliliter per dose) suitable for inhalative administration. Aerosol formulation containing the ingredients indicated below may be prepared by conventional techniques and are useful in treating bronchial asthma at a dose of from about 0.5 milliliter to 2.0 milliliters per day.

Ingredients: Composition, percent

| | |
|---|---|
| 3a-p-anisyl-1,2,3,3a,4,5-hexahydro-pyrrolo[1,2,2a]quinazolin-5-one | 0.4–20 |
| Ethyl alcohol | 10–40 |
| Ascorbic acid | 1–10 |
| Freon 11 | 10–30 |
| Freon 114 | 10–30 |
| Freon 12 | 10–30 |
| Buffer system-pH control, q.s. | |
| Flavor, q.s. | |

EXAMPLES 6 AND 7

Following the procedures of Examples 1 and 2, and in place of 3a-p-anisyl-1,2,3,3a,4,5-hexahydro-pyrrolo [1,2-a]quinazolin-5-one starting with a compound of Table I, below, tablets and capsules may be prepared which are useful in the treatment of bronchial asthma at a dose of one tablet or capsule 2 to 4 times a day.

EXAMPLES 8 AND 9

Following the procedures of Examples 3 and 4, and in place of 3a-p-anisyl-1,2,3,3a,4,5-hexahydro-pyrrolo[1,2-a]quinazolin-5-one starting with a compound of Table (14) 4a-methyl-5-(3,4-dichlorobenzyl)-2,3,4,4a,5,6-1, below, sterile suspensions for injection and oral liquid suspensions may be prepared, which are useful in the treatment of bronchial asthma. The injectable suspension is suitable for administration once a day whereas the oral liquid suspension is suitably administered 2 to 4 times per day for this purpose.

EXAMPLE 10

Following the procedure of Example 5, and in place of 3a - p - anisyl - 1,2,3,3a,4,5 - hexahydro-pyrrolo[1,2-a] quinazolin-5-one starting with a compound of Table I, below, Aerosol formulations for inhalation therapy may be proposed, which are useful in the treatment of bronchial asthma. The Aerosol formulation is suitable for administration 2 to 4 times per day.

TABLE I (1) 3a-phenyl-7-chloro-1,2,3,3a,4,5-hexahydro-pyrrolo [1,2-a]quinazoline-1,5-dione
(2) 3a-methyl-4-propyl-1,2,3,3a,4,5-hexahydro-pyrrolo [1,2-a]quinazoline-1,5-dione
(3) 8-chloro-4a-hexyl-5-(2,3,5-trifluorophenyl)-2,3,4, 4a,5,6-hexahydro-1H-pyrido[1,2-a]quinazolin-6-one
(4) 3a-methyl-7-chloro-1,2,3,3a,4,5-hexahydro-pyrrolo [1,2-a]quinazoline-1,5-dione
(5) 5a,6-dibutyl-9-methoxy-1,2,3,4,5,5a,6,7-octahydro-azepino[1,2-a]quinazoline-1,7-dione
(6) 9-ethoxy-5a-ethyl-6-(3-ethyl-4-chloro-5-fluoro-benzyl)-1,2,3,4,5,5a,6,7-octahydro-azepino [1,2-a]quinazoline-1,7-dione
(7) 3a-methyl-1,2,3,3a,4,5-hexahydro-pyrrolo [1,2-a]quinazolin-5-one
(8) 8-propoxy-4a-(3,4,5-trimethylphenyl)-5-amyl-2,3,4,4a,5,6-hexahydro-1H-pyrido[1,2-a] quinazolin-6-one
(9) 3a-amyl-7-isopropoxy-4-(3-propylphenyl)-1,2,3, 3a,4,5-hexahydro-pyrrolo[1,2-a]quinazoline-1,5-dione
(10) 3a-p-fluorophenyl-1,2,3,3a,4,5-hexahydro-pyrrolo [1,2-a]quinazolin-5-one
(11) 7-butoxy-3a-propyl-4-hexyl-1,2,3,3a,4,5-hexa-hydro-pyrrolo[1,2-a]quinazolin-5-one
(12) 4a-phenyl-2,3,4,4a,5,6-hexahydro-1H-pyrido [1,2-a]quinazolin-6-one
(13) 3a-p-anisyl-1,2,3,3a,4,5-hexahydro-pyrrolo [1,2-a]quinazolin-5-one
(14) 4a-methyl-5-(3,4-dichlorobenzyl)-2,3,4,4a,5,6-hexahydro-8-trifluoromethyl-1H-pyrido[1,2-a] quinazoline-1,6-dione
(15) 3a-(2,4-dimethylphenyl)-1,2,3,3a,4,5-hexahydro-pyrrolo[1,2-a]quinazolin-5-one
(16) 5a-hexyl-6-allyl-1,2,3,4,5,5a,6,7-octahydro-9-methyl-azepino[1,2-a]quinazoline-1,7-dione
(17) 9-ethyl-5a-isobutyl-6-(3,4-dimethyl-5-butyl-phenyl)-1,2,3,4,5,5a,6,7-octahydroazepino [1,2-a]quinazolin-7-one
(18) 3a-phenyl-1,2,3,3a,4,5-hexahydro-pyrrolo[1,2-a] quinazoline-1,5-dione
(19) 4a-ethyl-2,3,4,4a,5,6-hexahydro-8-propyl-1H-pyrido[1,2-a]quinazoline-1,6-dione
(20) 3a-(2-chloro-5-ethoxyphenyl)-4-(3-chloro-5-ethylbenzyl)-7-isopropyl-1,2,3,3a,4,5-hexa-hydro-pyrrolo[1,2-a]quinazolin-5-one
(21) 3a-methyl-1,2,3,3a,4,5-hexahydro-pyrrolo[1,2-a] quinazoline-1,5-dione

(22) 3a,7-dibutyl-4-methyl-1,2,3,3a,4,5-hexahydro-pyrrolo[1,2-a]quinazolin-5-one
(23) 8-amyl-4a-propyl-5-(3,4-propoxy-5-methylphenyl)-2,3,4,4a,5,6-hexahydro-1H-pyrido[1,2-a]quinazoline-1,6-dione
(24) 3a-methyl-4-phenyl-1,2,3,3a,4,5-hexahydro-pyrrolo[1,2-a]quinazoline-1,5-dione
(25) 5a-methyl-6-ethyl-9-hexyl-1,2,3,4,5,5a,6,7-octahydro-azepino[1,2-a]quinazolin-7-one
(26) 4a-methyl-1,2,3,4,5,6-hexahydro-4aH-pyrido[1,2-a]quinazoline-1,6-dione
(27) 5a-amyl-6-(4-butoxybenzyl)-1,2,3,4,5,5a,6,7-octahydro-azepino[1,2-a]quinazoline-1,7-dione
(28) 4a-phenyl-1,2,3,4,5,6-hexahydro-4aH-pyrido[1,2-a]quinazoline-1,6-dione
(29) 8-chloro-4a-isopropyl-5-propyl-2,3,4,4a,5,6-hexahydro-pyrido[1,2-a]quinazolin-6-one
(30) 3a-(3,4-dimethylphenyl)-1,2,3,3a,4,5-hexahydro-pyrrolo[1,2-a]quinazolin-5-one
(31) 3a-(2,4-dichloro-3,5-dimethylphenyl)-4-(3-methoxy-4-chloro-5-fluorophenyl)-1,2,3,3a,4,5-hexahydro-7-methoxy-pyrrolo[1,2-a]quinazolin-5-one

What is claimed is:

1. A method for treating bronchial asthma which comprises orally administering to a mammal in need of said treatment an antibronchial asthma effective amount of the compound of the formula

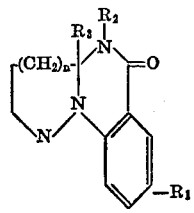

wherein
$n$ is 0 or 1,
A is carbonyl or methylene,
$R_1$ is hydrogen or chloro,
$R_2$ is hydrogen or phenyl,
$R_3$ is lower alkyl having 1 to 6 carbon atoms, or

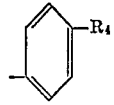

where $R_4$ is hydrogen, halo having an atomic weight of 19 to 36, straight chain lower alkyl having 1 to 5 carbon atoms, or straight chain lower alkyl having 1 to 4 carbon atoms, or

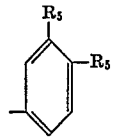

where $R_5$ is straight chain lower alkyl having 1 to 5 carbon atoms.

2. A method according to claim 1 wherein the compound is administered at a daily dose of from about 0.1 milligram to about 100 milligrams.

3. A method according to claim 1, wherein the compound is administered in a unit dosage form comprising said compound to the extent of from about 0.025 milligram to about 50 milligrams per unit dosage.

References Cited
UNITED STATES PATENTS
3,441,566  4/1969  Houlihan _____ 424—251

JEROME D. GOLDBERG, Primary Examiner

UNITED STATES PATENT OFFICE
CERTIFICATE OF CORRECTION

Patent No. 3,743,733            Dated July 3, 1973

Inventor(s) WILLIAM J. HOULIHAN

It is certified that error appears in the above-identified patent and that said Letters Patent are hereby corrected as shown below:

Column 3, line 63, " [1,2,2a] " should read -- [1,2-a] --.

Column 4, line 9, Delete "(14)4a-methyl-5-(3,4-dichlorobenzyl)-2,3,4,4a,5,6-".

Column 4, line 57, " (3,4-dichlorobenzyl) "

should read -- (3,5-dichlorobenzyl) --.

Column 5, line 35, should read,

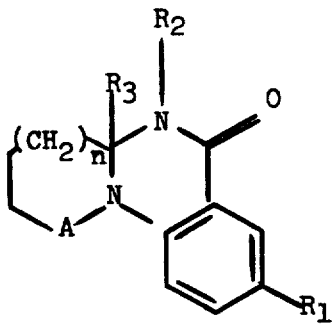

Column 6, line 15, " lower alkyl having "

should read -- lower alkoxy having --.

Signed and sealed this 29th day of April 1975.

(SEAL)
Attest:

RUTH C. MASON
Attesting Officer

C. MARSHALL DANN
Commissioner of Patents
and Trademarks